United States Patent
Vargas Rivero et al.

(10) Patent No.: US 10,293,745 B2
(45) Date of Patent: May 21, 2019

(54) PROJECTION OF A PRE-DEFINABLE LIGHT PATTERN

(71) Applicant: Audi AG, Ingolstadt (DE)

(72) Inventors: Jose Roberto Vargas Rivero, Augsburg (DE); Carsten Gut, Überlingen (DE); Johannes Reim, Eichstätt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/762,375

(22) PCT Filed: Sep. 23, 2016

(86) PCT No.: PCT/EP2016/072725
§ 371 (c)(1),
(2) Date: Mar. 22, 2018

(87) PCT Pub. No.: WO2017/050986
PCT Pub. Date: Mar. 30, 2017

(65) Prior Publication Data
US 2019/0016256 A1    Jan. 17, 2019

(30) Foreign Application Priority Data

Sep. 25, 2015    (DE) .......................... 10 2015 012 416

(51) Int. Cl.
*F21S 41/00*    (2018.01)
*B60Q 1/50*    (2006.01)
(Continued)

(52) U.S. Cl.
CPC .............. *B60Q 1/50* (2013.01); *B60Q 1/085* (2013.01); *B60Q 1/14* (2013.01); *B60Q 2300/23* (2013.01);
(Continued)

(58) Field of Classification Search
CPC . B60Q 1/50; B60Q 1/085; B60Q 1/14; B60Q 2300/23; B60Q 2300/324;
(Continued)

(56) References Cited

U.S. PATENT DOCUMENTS 8,733,939 B2    5/2014    Othmer
9,319,650 B2    4/2016    Katsumi
(Continued)

FOREIGN PATENT DOCUMENTS

CN    103963707 A    8/2014
CN    104204658 A    12/2014
(Continued)

OTHER PUBLICATIONS

English-language abstract of German Patent Application Publication No. DE 102006050548 A1, published Apr. 30, 2008; 2 pages.
(Continued)

*Primary Examiner* — Y M. Lee
(74) *Attorney, Agent, or Firm* — Sterne, Kessler, Goldstein & Fox, PLLC (57) ABSTRACT

The invention is directed to methods and devices to improve light patterns used to inform or assist an observer or a driver. The invention is related to an illuminating device and to a method for projecting a pre-definable light pattern using the illuminating device of the vehicle into an area surrounding the vehicle. According to the invention, a projection surface is determined in the area surrounding the vehicle, a position of a predefined observer has been determined or provided, and a light unit of the illuminating device is controlled pixel-wise according to the determined projection surface and the determined position of the predefined observer in order to produce the pre-definable light pattern.

16 Claims, 10 Drawing Sheets

(51) Int. Cl.
*B60Q 1/08* (2006.01)
*B60Q 1/14* (2006.01)
(52) U.S. Cl.
CPC .... *B60Q 2300/324* (2013.01); *B60Q 2400/50* (2013.01)
(58) Field of Classification Search
CPC .......... B60Q 2300/322; B60Q 2300/32; B60Q 2300/41; B60Q 2300/42; B60Q 2300/45; B60Q 2400/50
See application file for complete search history.

(56) References Cited

U.S. PATENT DOCUMENTS

| | | | |
|---|---|---|---|
| 2015/0009695 A1 | 1/2015 | Christmas et al. | |
| 2015/0163470 A1 | 6/2015 | Katsumi | |
| 2016/0090023 A1 | 3/2016 | Asaoka | |
| 2018/0253609 A1* | 9/2018 | Potter et al. | G06K 9/00791 |

FOREIGN PATENT DOCUMENTS

| | | |
|---|---|---|
| CN | 104302513 A | 1/2015 |
| DE | 102006050548 A1 | 4/2008 |
| DE | 102014000935 A1 | 7/2015 |
| EP | 1916153 A2 | 4/2008 |
| EP | 2101107 A2 | 9/2009 |
| EP | 2532950 A1 | 12/2012 |
| WO | WO 2014167394 A1 | 10/2014 |
| WO | WO 2015022115 A1 | 2/2015 |
| WO | WO 2015118890 A1 | 8/2015 |

OTHER PUBLICATIONS

English-language abstract of European Patent Application Publication No. EP 1916153 A2, published Apr. 30, 2008; 1 page.
English-language abstract of European Patent Application Publication No. EP 2101107 A2, published Sep. 16, 2009; 1 page.
English-language abstract of European Patent Application Publication No. EP 2532950 A1, published Dec. 12, 2012; 1 page.
English-language abstract of International Patent Application Publication No. WO 2015022115 A1, published Feb. 19, 2015; 2 pages.
English-language abstract of International Patent Application Publication No. WO 2015118890 A1, published Aug. 13, 2015; 1 page.
International Search Report and Written Opinion of the International Searching Authority related to International Patent Application No. PCT/EP2016/072725, dated Jan. 17, 2017, with attached English-language translation; 23 pages.
International Preliminary Report on Patentability directed to related International Patent Application No. PCT/EP2016/072725, dated Jun. 12, 2017, with attached English-language translation; 11 pages.

* cited by examiner

Grad = Degree

PROJECTION OF A PRE-DEFINABLE LIGHT PATTERN

TECHNICAL FIELD

The present invention relates to a method for projecting a pre-definable light pattern by means of an illuminating device of a vehicle into an area surrounding the vehicle. The present invention further relates to an illuminating device for a vehicle with a light unit and a control device for controlling the light unit. The present invention further relates to a motor vehicle with such an illuminating device.

BACKGROUND

As of yet, vehicles and particularly motor vehicles are known with a low beam which frequently has an almost static light distribution. Furthermore, the low beam is usually formed by a single light source, but pixel headlights are also known. The adjustment of the low beam depends on the driver or onboard information. There is rarely any interaction with the surrounding area.

The known control of the low beam is disadvantageous because the potential of the low beam, for example, is not utilized to communicate with the surroundings or to increasingly support the driver in his visual and perception task through purposeful adjustment of the light distribution.

From the document EP 1 916 153 A2, a method for displaying information is known, with which a projection object is generated at a projection location outside of a motor vehicle by means of a projection unit provided on the motor vehicle. An anticipated intended position of the motor vehicle is marked in a plane manner by a generated projection object.

In addition, the document DE 10 2006 050 548 A1 discloses a method for warning other traffic participants. By means of a projection unit, a projection object is generated at a projection point outside of the motor vehicle as warning reference for another traffic participant. In order to generate an undistorted image, a viewing angle of a respective observer is taken into account.

DETAILED DESCRIPTION

The present invention thus addresses the problem of providing a method, with which an illuminating device of a vehicle can be controlled more flexibly with regard to the surroundings of the vehicle.

According to the invention, this problem is solved by a method according to the claims.

According to the invention, an illuminating device according to the claims is additionally provided.

In an advantageous manner, a pre-definable light pattern is thus projected. This light pattern can be used purely for displaying information, or specifically illuminate parts of the surroundings for a better perception by an observer, particularly the driver. For the projection, the perspective of a predefined observer is explicitly taken into account. For that purpose, the projection surface (e.g. projection plane) in the area surrounding the vehicle, onto which the light pattern is projected, is determined. In addition, a position of the predefined or potential observer is provided for the perspective, for example, by means of sensors or, e.g. by means of data already stored. On the basis of the determined projection surface and the determined or provided position of the predefined observer, which together represent the observation perspective, a light unit (e.g. a pixel headlight) of the illuminating unit is controlled in a pixel-wise manner in order to generate the pre-definable light pattern on the projection surface. Therefore, the concrete perspective or correspondingly the projection surface or plane and the position of the observer is thus taken into account, when the light pattern is generated. As a result, information for the observer can be made easier to read or an illumination can be more individualized.

For example, the predefined observer is a driver or passenger of the vehicle or a pedestrian at a predefined position outside of the vehicle, or a person in a passing vehicle. For all these observers, for which the light pattern can be intended, the head position, which is important for the actual perspective, can be obtained quite accurately and simply from sensor data of the vehicle interior or the vehicle surroundings.

When the projection surface is determined, a change of position of the vehicle or an object in the surroundings can be taken into account. As a result, the method can be dynamically updated. For example, a trajectory of the vehicle or the object can be used for that purpose.

In addition, a topography in front of the vehicle can be analyzed, when the projection surface is determined. For example, the surroundings in front of the vehicle are detected by sensors, and a suitable projection plane or surface is extracted from the data.

In a further embodiment, a characteristic of the surroundings can be taken into account for the pixel-wise control of the light unit of the illuminating device. For example, such a characteristic can be the condition of a projection surface, such as degree of reflection or granularity of the surface. A characteristic of the surroundings can also be a current traffic density, the type of a road, a point of interest, the dampness of the traffic lane, or the ambient brightness. Due to such a characteristic, the projection of the light pattern can be further individualized, and so it can be of even greater benefit for the observer.

Advantageously, with the pixel-wise control of the light unit of the illuminating device, a vehicle in front or an oncoming vehicle, current vehicle data, information from or about the driver, a distance of the light pattern from the vehicle and the like is taken into account. With these parameters, the light pattern can also be influenced advantageously.

In a particular embodiment, the illuminating device as light unit can have a plurality of headlights, and with the pixel-wise control of the illuminating device, the headlights can be controlled such that the pre-definable light pattern is produced on the projection surface. In other words, a plurality of headlights can be utilized for producing the light pattern which allows for the improvement of the variability or the resolution of the light pattern.

The illuminating device according to the invention can be functionally developed with the method features described above. In addition, a vehicle can be equipped with said illuminating device.

Figure 1:
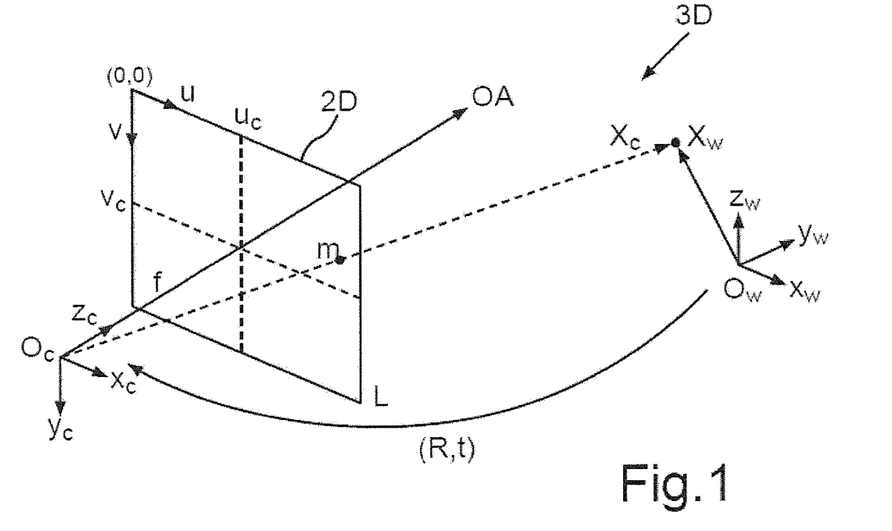
FIG. 1 illustrates a schematic representation of a pinhole camera model.
Figure 2:
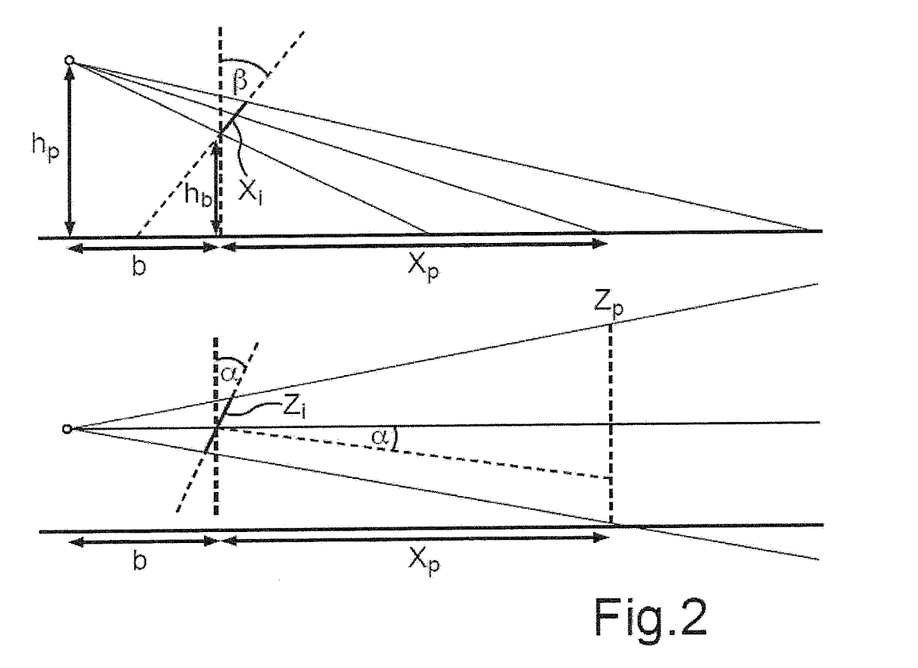
FIG. 2 illustrates a schematic representation of the geometry for calculating the coordinates in a side view and a top view.
Figure 3:
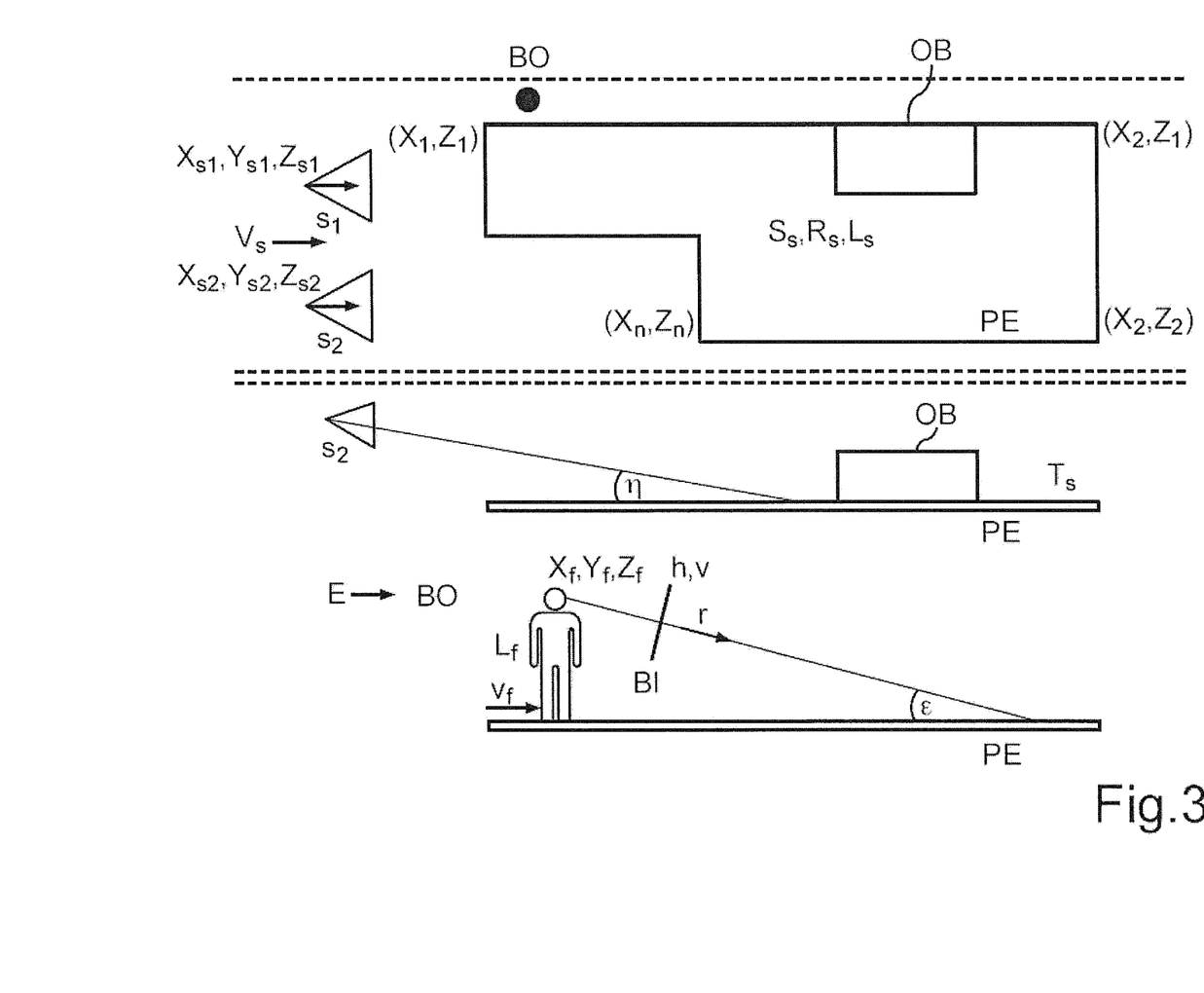
FIG. 3 illustrates a schematic representation of views for determining a perspective.
Figure 4:
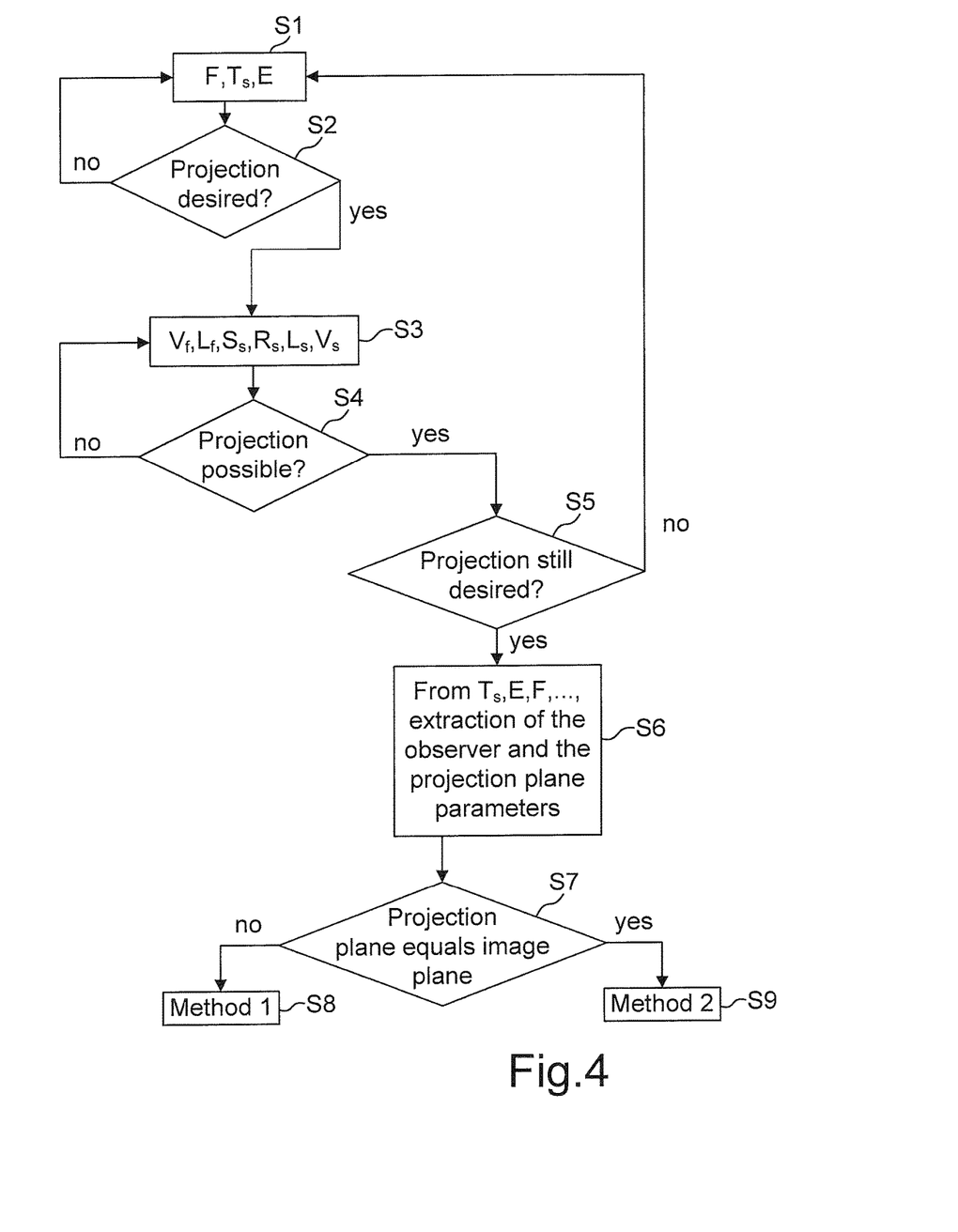
FIG. 4 illustrates a schematic representation of a diagram for the method selection.
Figure 5:
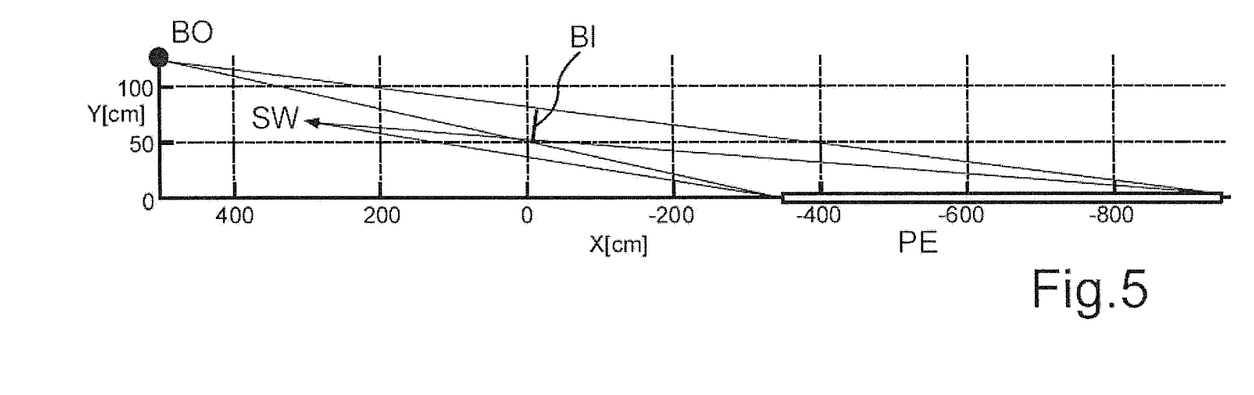
FIG. 5 illustrates a schematic representation of a projection in the side view.
Figure 6:
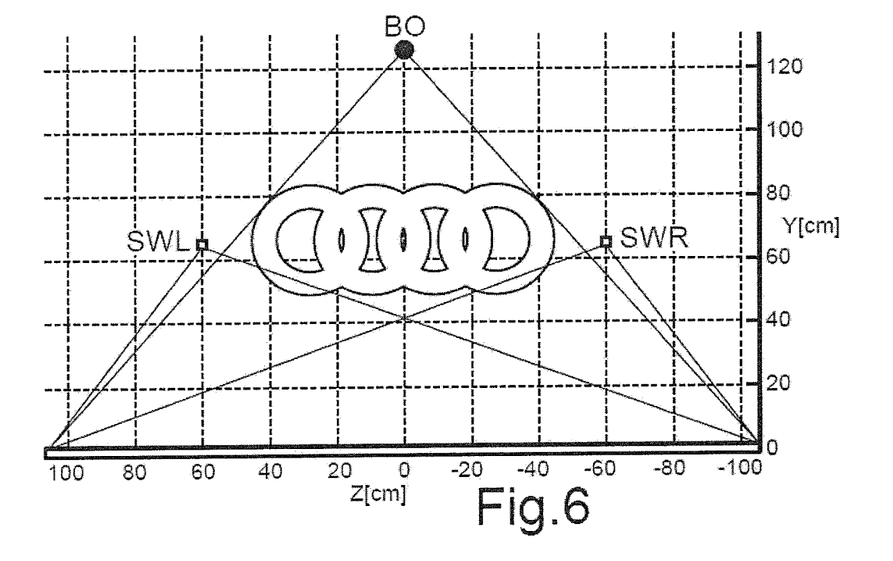
FIG. 6 illustrates a schematic representation of the projection of FIG. 5 in the front view.
Figure 7:
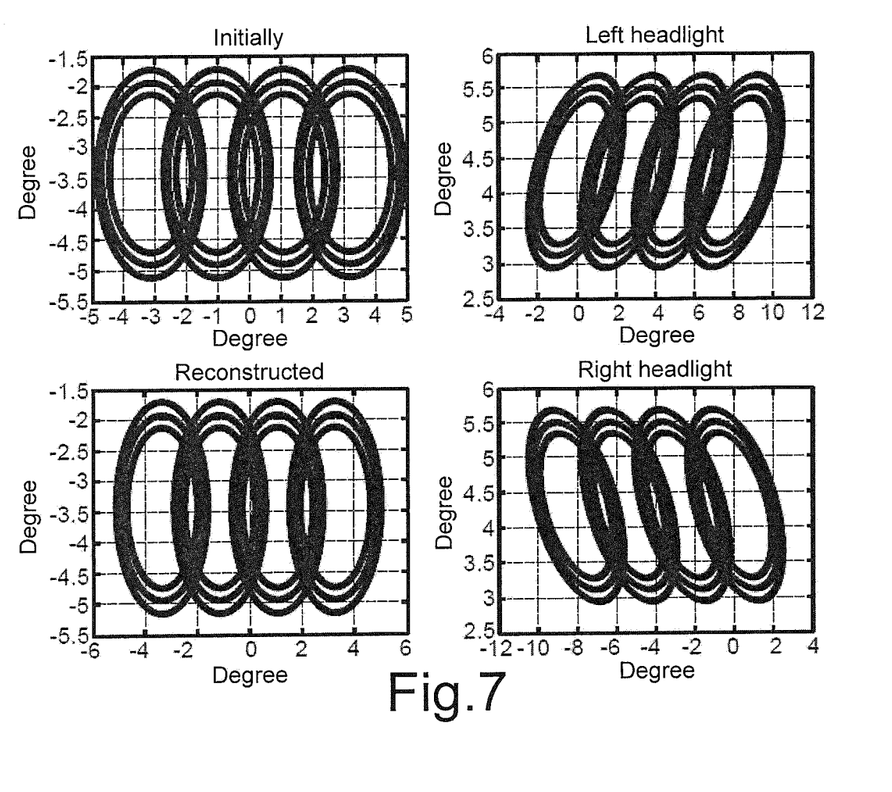
FIG. 7 illustrates a schematic representation of individual projection steps.
Figure 8:
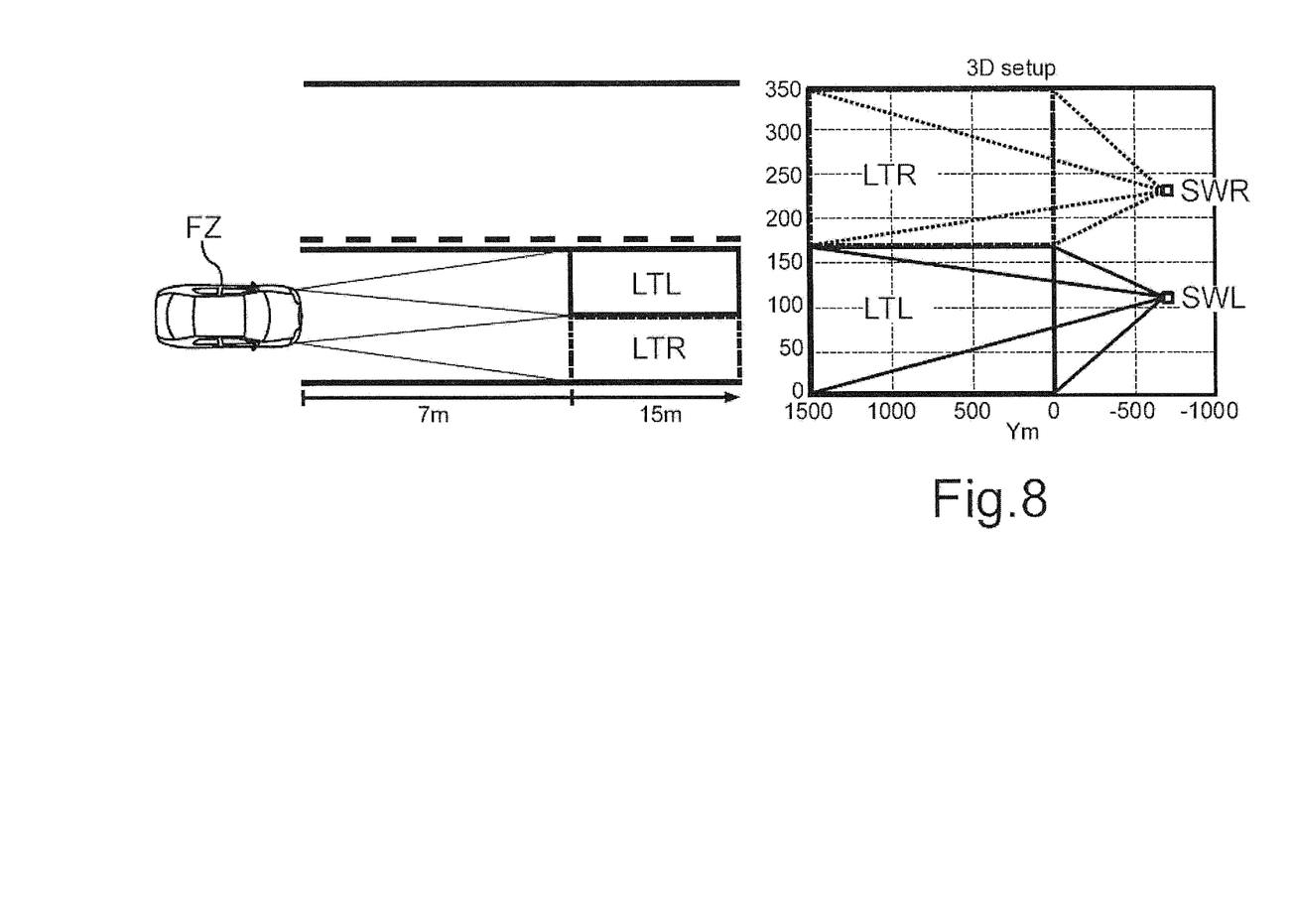
FIG. 8 illustrates a schematic representation of a carpet of light for a vehicle.
Figure 9:
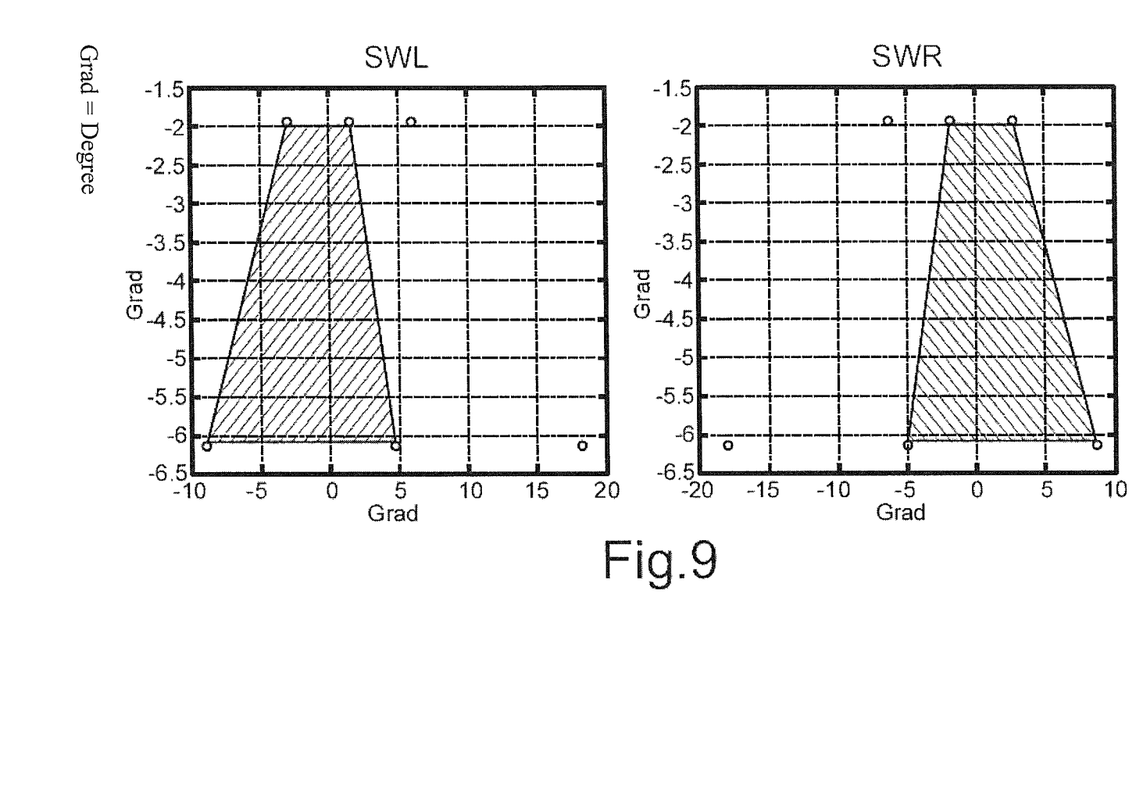
FIG. 9 illustrates a schematic representation of the corresponding carpet of light from the perspective of the headlights.
Figure 10:
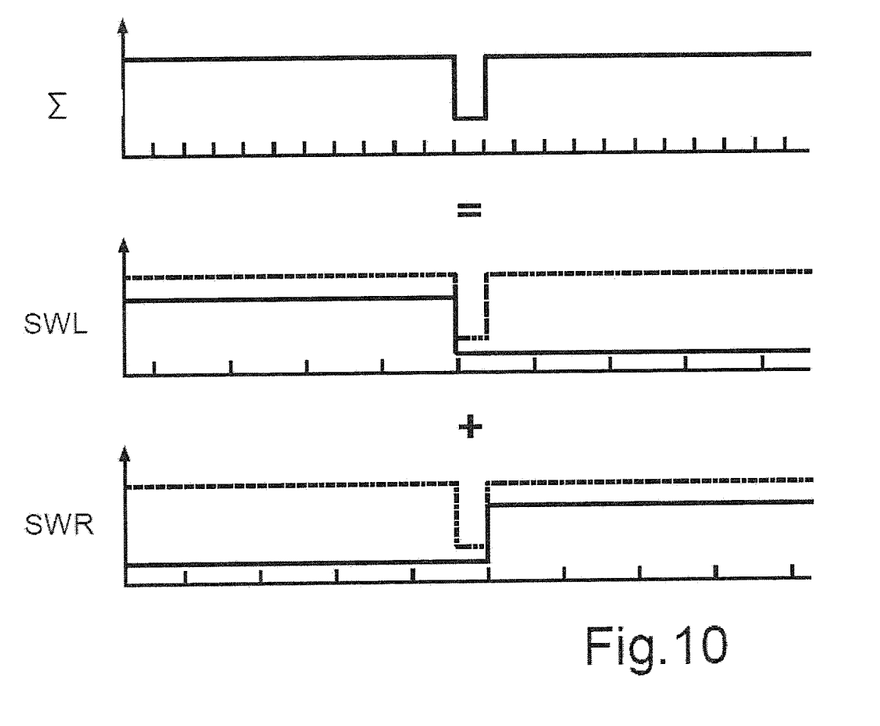
FIG. 10 illustrates a schematic representation of a light distribution with two headlights.

In the following, the present invention shall be explained in more detail using the attached drawings which show:

FIG. 1 a pinhole camera model;
FIG. 2 the geometry for calculating the coordinates in a side view and a top view;
FIG. 3 views for determining a perspective;
FIG. 4 a diagram for the method selection;
FIG. 5 a projection in the side view;
FIG. 6 the projection of FIG. 5 in the front view;
FIG. 7 individual projection steps;
FIG. 8 a carpet of light for a vehicle;
FIG. 9 the corresponding carpet of light from the perspective of the headlights;
FIG. 10 a light distribution with two headlights; and
FIG. 11 a diagram for calculating the pixel intensity.

The embodiments described in more detail in the following are preferred embodiments of the present invention. It must be noted that the individual features can be realized not only in the described combination but also in isolation or in other technically meaningful combinations.

The invention proceeds from the approach that a low beam is supposed to be a high-resolution beam and can be realized, for example, by a pixel headlight. This, for example, allows for perspective representations which are adjusted to the surroundings. In addition, interactions with the surroundings are possible. Furthermore, the road topology and the distance to other vehicles can be taken into account in order to achieve a situation-dependent control of the illuminating device, particularly of a vehicle. The central idea is that of determining the concrete perspective by taking into account the position of the observer as well as the current concrete projection plane or surface in the surroundings of the vehicle for the pixel-wise control of the light unit of an illuminating device.

For a concrete representation of a high-resolution light distribution in the low beam, a plurality of parameters can be determined and provided in the form of a corresponding sensor signal. In the following, such possible parameters shall be listed without representing a final list:

a) A first parameter for controlling the light unit of an illuminating device can be a change of position of the driver's vehicle or reference vehicle. This parameter is important to ensure that the desired light distribution is always projected at the same horizontal and vertical distance. For example, a nodding, pitching, and rolling motion can be detected by means of acceleration sensors. With this parameter, the eye/head position $X_f$, $Y_f$, $Z_f$ . . . can be updated, and the line of vision can be determined according to a vector r. In addition, it is possible to determine the coordinates $X_{s1}$, $Y_{s1}$, $Z_{s1}$ . . . as well as the line of vision vector $S_1$ . . . for each headlight.

b) A second parameter would be the change of position of objects, such as the road markings. This parameter is important because the objects are references, with which a light distribution can orient itself. With this parameter, the topography $T_s$ can also be determined.

c) A third parameter would be the topography mainly in front of the vehicle. This also includes the detection of projection surfaces other than the road, such as a garage wall. The vertical and horizontal variable v, h of the light distribution can also be determined. For the calculation of a correct, undistorted light image, an exact knowledge of the geometry of the projection surface is necessary. With this parameter, the topography $T_s$ can also be determined.

d) The condition of the projection surface is also an important parameter. This includes the degree of reflection and the reflection properties as well as the granularity of the surface. Due to the reflection properties, the required light intensity and the imaging quality can be determined. The visibility $S_s$, the reflectivity $R_s$, and the light density $L_s$ of the projection surface can be determined with this parameter.

e) According to a further parameter, it can be determined whether the light function is supposed to be seen from the perspective of a driver, a passenger, a pedestrian, or a person in a different vehicle. The distortion correction must be calculated accordingly. The line of vision vector r of one or more observers can also be determined therefrom.

f) In this parameter, the head position of the driver (of driver's vehicle or the other vehicle) or the position of the pedestrians but, if necessary, also their trajectory can be stored. As a result, the perspective distortion from parameter e) can be calculated more precisely. The parameter $h_p$ (head height of the observer), β (line of vision with regard to the road), a (lateral line of vision), b (distance between head of the observer and image plane) can be calculated according to parameters e) and f). From the eye and head position of one or more observers: $X_f$, $Y_f$, $Z_f$. In addition, the line of vision vector r of one or more observers can also be determined therefrom. The speed $v_f$ of one or more observers can be determined therefrom.

g) A further parameter can provide the actual traffic density. From this parameter, it can be determined which projection distance is to be selected. At a high traffic density, the projection distance is shortened, and at a low traffic density (e.g. on a rural road), the projection distance can be increased. The vertical and horizontal variable v, h of the light distribution can also be determined therefrom. The visibility $S_s$ of a light function can also be determined from this parameter. A decision as to which function F is supposed to be represented can also be derived therefrom.

h) A further parameter relates to the type of road and, if necessary, relevant points of interest (urban surroundings, highway, construction site, accident, etc.). On the basis of this parameter, the desired light function can be activated. A decision as to which function F is supposed to be represented can also be derived therefrom.

i) A further parameter can relate to the dampness of the traffic lane. On the basis of this parameter, the desired light function can be activated or be taken into account for the illumination. The visibility $S_s$ of the light function, the reflectivity $R_s$, and the light density $L_s$ of the projection surface can also be determined with this parameter. Furthermore, a decision as to which function F is supposed to be represented can be derived therefrom.

j) The ambient brightness (illumination from a vehicle, street lights, twilight, daylight) represents a further parameter. With this parameter, the light intensity can be adjusted and a desired light function can be activated. The light density of the ambient brightness $L_f$ can be determined therefrom.

k) One parameter can be the distance and/or the coordinates to a vehicle in front or an oncoming vehicle, and the vehicle topology. With this parameter, a vehicle can be precisely illuminated. If the vehicle topology is known, information or symbols can additionally also be projected onto another vehicle. The vertical and horizontal variable v, h of the light distribution can also be determined therefrom. For example, the size of the logo projection onto a vehicle can be based thereon. The topography $T_s$ can also be determined from this parameter.

l) A further parameter can be the user request or a user requirement. This can be detected by actuating a button, eye tracking, driving behavior, voice recognition, wellbeing, and the like. A desired light function/light distribution can thus be activated or adjusted. A decision as to which function F is supposed to be represented can also be derived therefrom.

m) Vehicle data such as GPS and speed can represent an important parameter. A desired light function/light distribution can thus be activated or adjusted. The speed of the vehicle occupants $v_v$ can also be determined therefrom. A decision as to which function F is supposed to be represented can once again also be derived therefrom.

n) A further parameter is the interior illumination. A desired light function/light distribution can be activated or adjusted with it. For example, in case of an activated interior illumination, the area in front of the low beam can be made brighter. The light density of the interior illumination $L_f$ can be determined from this parameter.

o) The distance of a desired projection to the reference vehicle is conceivable as a further parameter. It can be used to calculate the overlap of left and right headlight for the correct representation of the light distribution. The topography $T_s$ can also be determined from this parameter.

p) A further parameter can be used as decision input which represents the decision of the driver, who is supposed to be an observer of the light function. This can be input, for example, by pressing a button, by means of an MMI (mind-machine interface) or an APP. As a result, the driver can decide whether, e.g. a logo projection is supposed to be perspectively undistorted from the driver's point of view or from the point of view of a pedestrian. This decision overrides the function mapping (see below). The decision parameter E can be determined therefrom.

Different light functions can be defined. A corresponding observational perspective is assigned to said light function. This assignment results in a so-called "function mapping." For example, the driver perspective is assigned to the function "construction site light" because the illumination of a construction site is predominantly important to the driver. The function "illumination of a crosswalk" would have to be assigned to a pedestrian perspective because a pedestrian is supposed to clearly see the crosswalk. The projection of a logo, for example, can be assigned to a driver perspective in a presetting. If necessary, this assignment can be changed by an MMI/APP, and so a pedestrian can also see the logo quite clearly.

| Functions for driver | Functions for passenger | Functions for other vehicle | Functions for pedestrians |
|---|---|---|---|
| Construction site light | Welcome text | Overtaking cue | Crosswalk |
| ... | ... | ... | Logo |
| ... | ... | ... | ... |

The above table shows that the perspectives which result from a vehicle's point of view for the projection of a light pattern, can, for example, be divided into four areas or categories. Therefore, this results in perspectives or functions for a driver, a passenger, another vehicle, or a pedestrian. The respective function then ensures that the projection is not distorted from the corresponding perspective. However, in some situations, it is possible that the function cannot be represented for the desired perspective. Therefore, a decision has to be made whether or not the light function is made available.

In the following, an exemplary algorithm for calculating the desired light distribution as a basis for the control of the light unit of the illuminating device will be described. The method is based on the pinhole camera model with homogeneous coordinates as is shown in FIG. 1. Starting point, for example, is a camera center $O_c$, which in the present case corresponds to the optical center, e.g. of a headlight. A 3D point cloud is supposed to be generated with said optical center, in which each point is represented, for example, by a value $X_w$. In the real world, such a point is located in a coordinate system $O_w$. A 2D plane or image plane (2D) can be defined, through which each projection beam passes from the headlight center $O_c$ to the 3D point $X_w$ and where it subsequently defines a point m. This pinhole camera model can be used to convert a specific image on the road into a two-dimensional image in terms of the headlight plane.

The two-dimensional coordinates can be calculated with the following equations, wherein u and v belong to the image plane coordinates, and k belongs to the intrinsic camera parameters. H corresponds to the extrinsic camera parameter. The road image is represented by a point cloud, wherein the values are stored in X, Y, and Z. R and t corresponds to a rotation or shift between the camera and the global frame coordinates.

$$\tilde{m} = [uv1]^T \tag{1}$$

$$\tilde{m} = K\Pi\tilde{X}_w \tag{2}$$

$$\tilde{X}_w = [XYZ1]^T \tag{3}$$

$$K = \begin{bmatrix} k_u f & y & u_0 \\ 0 & k_u f & v_0 \\ 0 & 0 & 1 \end{bmatrix} \tag{4}$$

$$\Pi = [R \mid t] \tag{5}$$

The image plane coordinates are (converted into angles) are present as follows:

$$\alpha_u = \tan^{-1}\left(\frac{u}{f}\right); \alpha_v = \tan^{-1}\left(\frac{v}{f}\right) \tag{6}$$

The angular values can be converted for any headlight technology into pixel positions and stored in a corresponding image or video format. The method also uses a trigonometric approach for calculating the two-dimensional coordinates $X_p$, $Z_p$, wherein each pixel $X_1$, $Z_1$ is projected onto the road for a specific observer head position and line of vision. For that purpose, it is assumed that the image plane is located perpendicularly to the line of vision of the observer. In the present document, the coordinate X is assigned, for example, to the vehicle longitudinal direction or direction of travel, the coordinate Z is assigned to the road transverse direction, and the coordinate Y is assigned to the height direction of the vehicle.

FIG. 2 shows the geometry for calculating the two-dimensional coordinates $X_p$ and $Z_p$ on a projection plane, e.g. a road. The upper drawing in FIG. 2 shows the side view and the bottom drawing shows the top view.

$h_p$ corresponds to the observer head height, β corresponds to the line of vision with regard to the road, α corresponds to the lateral line of vision, b corresponds to the distance between the observer head and the image plane, and $h_b$ represents the lower part of the image and the road. An error of approximately 2.5% for angular values (α or β) of up to 14° must be expected. This error is calculated from the distance between the pixels of the initial image and those, which are calculated with this method from the driver's point of view.

The two-dimensional coordinates $X_p$ and $Z_p$ on the projection plane follow from the following equations:

$$X_p = \frac{b}{\frac{h_p}{X_i + h_b} - 1} \quad (7)$$

$$Z_p = Z_i\left(1 + \frac{X_p \cos a}{b}\right) \quad (8)$$

In connection with FIG. 3, it shall now be described briefly, how information is obtained from the above-mentioned parameters or the different sensor data in order to determine the required physical or geometric values. If not otherwise specified, all values refer to a global reference point on the road. For example, c represents the angle between the observer(s) BO from the center of the road surface or projection plane PE, onto which the image BI is projected. The coordinates of each corner of the section of road surface, i.e. the projection plane PE, onto which the image BI is projected, are: $I_1$, $Z_1$ ... $X_n$, $Z_n$. In the example of FIG. 3, an additional object OB is located on the projection plane. The top view thus shows the topography $T_s$ according to the uppermost drawing in FIG. 3. The vehicle is symbolized by the two headlights with the line of vision or beam direction vectors $S_1$ and $S_2$. It moves with the speed $v_s$. The topography $T_s$ for the surroundings in front of the vehicle can be seen with regard to the projection beam in the side view according to the center drawing of FIG. 3. The bottom drawing of FIG. 3 finally shows the reflection beam which the observer BO notices. Together with all other reflection beams, this results in an image BI in an image plane. Projection beam and reflection beam result in the corresponding perspective of the observer BO. For controlling the illuminating device, the observer BO is able to influence a decision parameter E.

Once all the input parameters are determined or provided, a corresponding geometric calculation can be executed, with which each of the required pixels must be activated in a two-dimensional headlight plane in order generate a specific image for a specific observer. In this calculation, the intensity is not yet taken into account but will be determined independently in a later step.

FIG. 4 shows a workflow for the geometric calculation at a specific point in time t. In a first step S1, input parameters are provided, such as the function F (e.g. construction site light, logo representation, etc.), the topography $T_s$, or the decision parameter E (e.g. driver or passenger as observer). In a following step S2, it is automatically or manually decided, whether a projection is desired. It is not desired, for example, if the topography is not suitable or a vehicle is driving directly in front. In the subsequent step S3, if the projection is desired, physical parameters such as $v_f$, $L_f$, $S_s$, $R_s$, $L_s$, $v_s$ or the like are calculated. In the following step S4, it is decided, whether the projection is still possible. For example, the projection is not possible if the speed at a constantly changing projection plane is too high. If the projection is possible, it is queried in step S5 whether the projection is still desired. If not, a return to step S1 is effected. If the projection is still desired, observer parameters and projection surface parameters are extracted in step S6 from the input parameters of step S1. This includes the head position and the line of vision as well as the light density. It is subsequently verified, whether the projection plane equals the image plane. If this is not the case, the following method 1 is executed. However, if the projection plane equals the image plane and the observer looks, for example, perpendicularly onto the road, onto which the image of the light pattern is projected, method 2 is applied. Method 2 is based on the pinhole camera model and significantly simpler than method 1.

Method 1 is divided into the following steps:

Step 1: The image is binarized and the points, which are supposed to be illuminated, are extracted and stored as coordinates $X_1$, Z, (image plane).

Step 2: Based on the values of $X_f$, $Y_f$, $Z_f$, r, ε, $X_1$, $Z_1$ ... $X_n$, $Z_n$, h, v and the equations (7) and (8), each point in $X_1$, $Z_1$ is scaled (i.e. adjusted to the projection plane) and projected onto the surface defined by the points $X_1$, $Z_1$, ... $X_n$, $Z_n$ and adjusted to the topology $T_s$. If $X_i$, $Z_i$ forms a binary matrix, the adjustment to a specific topography is defined as the Hadamard product between the matrix at $X_1$, $Z_1$ and the topography matrix $T_s$ (herein only considered as a binary matrix). If both matrices are not of the same size, interpolation techniques can be used.

Step 3: The surface defined by the points $X_1$, $Z_1$, ... $X_n$, $Z_n$ is separated into subsurfaces. For example, each of the headlights, which together form the light unit of an illuminating device, can illuminate a subsurface.

Step 4: Based on the values of $X_{s1}$, $Y_{s1}$, $Z_{s1}$, ..., $S_1$ ... and the equations (1) to (6) as well as the separation in step S3, a 2D projection is calculated for each headlight.

Step 5: Based on the headlight technology and geometry, each 2D projection (i.e. the planar point distribution) is converted into a specific image format adjusted to such a headlight (the pixel intensity is based on the pixel intensity calculation).

Step 6: Based on $v_s$ and $v_f$, each image can be converted into a video sequence.

Based on the circumstances, there are different optimization options for reducing the latency period, such as integration of the second to fourth step into a single matrix operation. It is further possible to compare the initial image with the image generated with this method in order to obtain a quality criterion.

FIGS. 5 to 7 show an example, in which the Audi logo is projected onto the road for the driver perspective. Hereto, FIG. 5 shows the geometry in a side view. A headlight SW projects a light pattern onto a projection plane PE, resulting for the observer BO in an image BI in an image plane. In the present case, the resulting perspective, for example, corresponds to a driver perspective. The front view, in which the transverse coordinate Z is plotted horizontally and the height coordinate Y is plotted vertically, shows the constellation of FIG. 6. The left headlight SWL, together with the right headlight SWR, is supposed to project the undistorted Audi logo for the driver or observer, who is positioned between the two headlight. For that purpose, an initial or desired light pattern according to the drawing on the upper left side in FIG. 7 is predefined. In this desired form, the projection plane and the position of the observer or driver is already taken into account. However, since two headlights in different positions are supposed to generate the light pattern, corresponding images or control signals in accordance with the drawings on the right side of 7 must be determined for the left headlight SWL and the right headlight SWR. Combined, this subsequently results for the observer BO from his/her perspective in the reconstructed image at the bottom left of FIG. 7.

The second method indicated in FIG. 4 comprises the following steps:

Step 1: Same as in method 1

Step 2: Based on the values of $X_1$, $Z_1$, ... $X_n$, $Z_n$, h, v, each point $X_1$, $Z_1$ in the image plane is scaled and adjusted to the surface defined by the points $X_1$, $Z_n$ as well as to the topography $T_s$.

Steps 3 to 6: Same as in method 1

Similar to method 1, there are also different optimization options for method 2 to reduce the latency period. For example, steps 2 to 4 can be integrated into a single matrix operation.

FIGS. 8 and 9 show a possible light distribution for the two headlights. On the left, FIG. 8 shows a vehicle FZ which is supposed to generate a rectangular carpet of light on a traffic lane of a road. For that purpose, the left headlight is supposed to generate a left carpet of light LTL, and the right headlight is supposed to generate a right carpet of light LTR. The drawing on the right in FIG. 8 shows in a mirrored view the beam paths for the corners of the carpets of light LTL and LTR in terms of the two headlights SWL and SWR.

FIG. 9 shows the 2D image of each of the headlights SWL and SWR on the corresponding headlight plane. This means that in each of the headlights, those pixels are supposed to shine which lie in each of the highlighted areas. Together with the headlight geometry and optics as well as the selected projection plane, this result in the carpet of light with the two parts LTL and LTR.

In the following, it shall be described how the pixel intensity is to be calculated. Based on the values of $L_f$, $S_s$, $R_s$, $L_s$, $T_s$ as well as the parameters of observer and projection plane or road surface, the provisions of the road traffic regulations, the geometry of the headlights and their technology, the number of headlights, and the 2D projections which are calculated with methods 1 and 2, it is possible to calculate exactly the intensity per pixel which is required to generate a desired light distribution on the road.

In the following, the overlap areas for two or more headlights shall be determined as an example. The desired light distribution $\hat{x}$ can be calculated from the sum of all overlapping images $y^k$ multiplied by the factor $A^k$ for all overlapping headlights K according to the formula:

$$\hat{x} = \Sigma_{k=1}^K A^k y^k (9) \qquad (9)$$

On top, FIG. 10 shows the desired light distribution in total. It is composed of the light distribution of the left headlight SWL added to the light distribution of the right headlight SWR.

The overlap of a plurality of headlight images can increase the intensity but can also improve the resolution.

Figure 11:
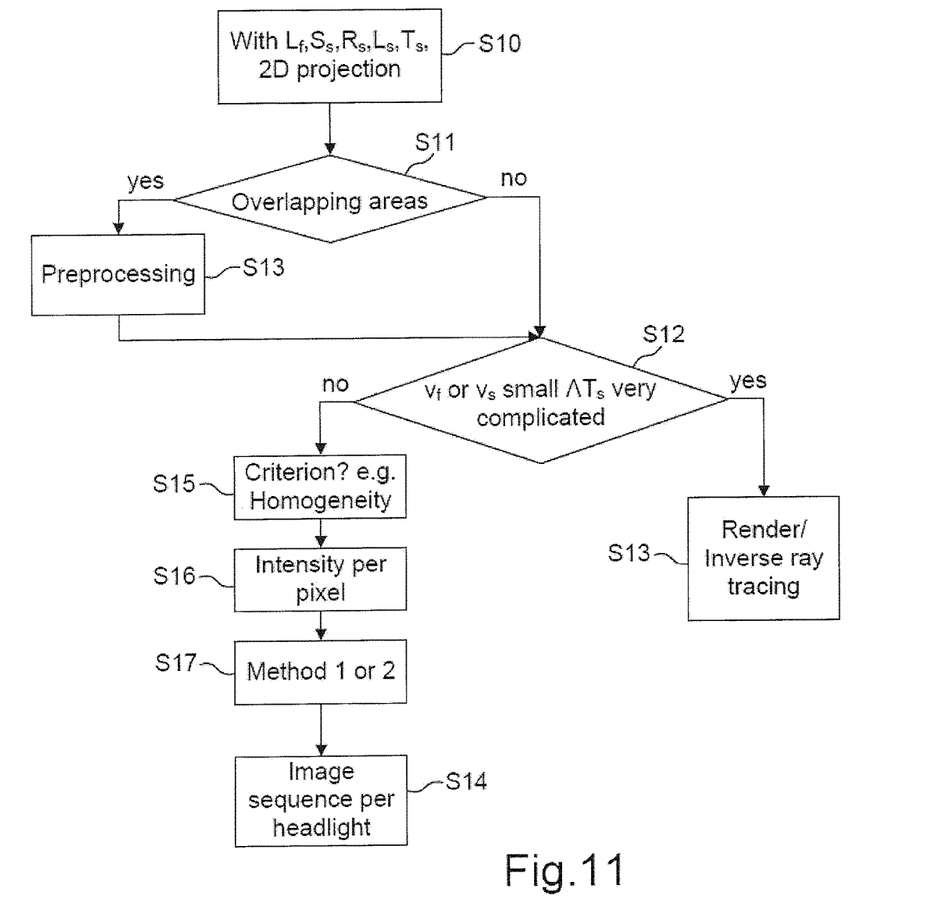
FIG. 11 illustrates a schematic representation of a diagram for calculating the pixel intensity.

FIG. 11 shows a workflow diagram for calculating the pixel intensity. In step S10, all physical and geometric input parameters for the intensity calculation are provided. In the subsequent step S11, it is verified, whether overlapping areas are present. If not, step S12 follows. However, if overlapping areas are present, step S13 follows, in which a preprocessing of the data or with regard to an increased resolution or special effects is effected. Subsequently, this is also followed by step S12. In step S12, it is verified whether the speeds of interest are low and the topography $T_s$ concerned is very complex. If this AND requirement is met, a time-consuming calculation can be executed in step S13. For that purpose, for example, a 3D image processing with a so-called "render" or "inverse ray tracing" can be effected. In step S14, an image sequence per headlight is subsequently generated.

However, if the AND requirement of step S12 is not met and, for example, one of the speeds is too high, a predefined criterion, e.g. the homogeneity or a desired intensity course is verified in step S15. In step S16, the intensity per pixel is subsequently determined. In step S17, one of the methods 1 or 2 for calculating the projection geometry or the pixel position is then executed. This is also followed by a jump to step S14.

Advantageously, light functions, which can be formed according to the described schemes, offer the option to actually improve or worsen the visibility of objects in the surroundings, when compared to other driver assistance systems such as head-up displays. In addition, light assistance functions for future piloted driving can contribute to a communication and interaction with the surroundings. With the adjustment of the low beam to the above-mentioned parameters, the driver can be supported in his/her visual and perception task. With a concrete technical implementation, a specialized GPU (graphic processor unit) can be connected to a headlight, a control unit (in which the aforementioned method is implemented), and sensors for the required sensor data. This can be implemented in an architecture and a programming language which is optimized for a normal latency period.

With regard to the headlight, it is advantageous if it is a high-resolution headlight, e.g. on the basis of a DMD (digital micro device) or a scanner with at least 100 pixels. For the development of future light functions, they must be selected such that they support the driver subconsciously without being a distraction. Light functions in the low beam are not visible, when the road is wet, the external illumination is too bright, or in case of a vehicle in front, and they must thus be used in a situation-related manner.

The invention claimed is:

1. A method for projecting a pre-definable light pattern using an illuminating device of a vehicle in an area surrounding the vehicle, the method comprising:
    determining a projection surface in the area surrounding the vehicle for a perspective of a predefined observer;
    determining or providing a position of the predefined observer for the perspective; and
    pixel-wise controlling of a light unit of the illuminating device based on the determined projection surface and the determined position of the predefined observer for generating the pre-definable light pattern, wherein:

the projection surface is determined based on a change of a position of the vehicle or an object in an area surrounding the vehicle, or the position of the predefined observer is determined or provided based on a trajectory of the predefined observer.

2. The method according to claim 1, wherein the predefined observer is a driver or a passenger of the vehicle, a pedestrian at a predefined position outside of the vehicle, or a person in a passing vehicle.

3. The method according to claim 1, further comprising:
after the determining the projection surface, analyzing a topography in front of the vehicle.

4. The method according to claim 1, wherein the pixel-wise controlling of the light unit comprises:
pixel-wise controlling of the light unit further based on a property of the area surrounding the vehicle.

5. The method according to claim 1, wherein the pixel-wise controlling of the light unit comprises:
pixel-wise controlling of the light unit further based on a second vehicle in front of the vehicle, an oncoming vehicle, current vehicle data, information from or about a driver of the vehicle, or a distance of the pre-definable light pattern from the vehicle.

6. The method according to claim 1, wherein the light unit of the illuminating device comprises a plurality of headlights and the pixel-wise controlling of the light unit comprises:
controlling the plurality of headlights to generate the pre-definable light pattern on the projection surface.

7. An illuminating device for a vehicle, the illuminating device comprising:
a light unit;
a processing unit configured to determine a projection surface in an area surrounding the vehicle for a perspective of a predefined observer and to determine or provide a position of the predefined observer for the perspective; and
a control device configured to pixel-wise control the light unit based on the determined projection surface and the determined position of the predefined observer to generate the pre-definable light pattern,
wherein the processing unit is configured to:
determine the projection surface based on a change of a position of the vehicle or an object in the area surrounding the vehicle, or
determine or provide the position of the predefined observer based on a head position or a trajectory of the predefined observer.

8. The illuminating device according to claim 7, wherein the predefined observer is a driver or a passenger of the vehicle, a pedestrian at a predefined position outside of the vehicle, or a person in a passing vehicle.

9. The illuminating device according to claim 7, wherein the control device is configured to pixel-wise control the light unit further based on a property of the area surrounding the vehicle.

10. The illuminating device according to claim 7, wherein the control device is configured to pixel-wise control the light unit further based on a second vehicle in front of the vehicle, an oncoming vehicle, current vehicle data, information from or about a driver of the vehicle, or a distance of the pre-definable light pattern from the vehicle.

11. The illuminating device according to claim 7, wherein the light unit of the illuminating device comprises a plurality of headlights and the control device is configured to pixel-wise control the light unit by controlling the plurality of headlights to generate the pre-definable light pattern on the projection surface.

12. A vehicle comprising:
an illuminating device, the illuminating device comprising:
a light unit;
a processing unit configured to determine a projection surface in an area surrounding the vehicle for a perspective of a predefined observer and to determine or provide a position of the predefined observer for the perspective; and
a control device configured to pixel-wise control the light unit based on the determined projection surface and the determined position of the predefined observer to generate the pre-definable light pattern,
wherein the processing unit is configured to:
determine the projection surface based on a change of a position of the vehicle or an object in the area surrounding the vehicle, or
determine or provide the position of the predefined observer based on a head position or a trajectory of the predefined observer.

13. The vehicle according to claim 12, wherein the predefined observer is a driver or a passenger of the vehicle, a pedestrian at a predefined position outside of the vehicle, or a person in a passing vehicle.

14. The vehicle according to claim 12, wherein the control device is configured to pixel-wise control the light unit further based on a property of the area surrounding the vehicle.

15. The vehicle according to claim 12, wherein the control device is configured to pixel-wise control the light unit further based on a second vehicle in front of the vehicle, an oncoming vehicle, current vehicle data, information from or about a driver of the vehicle, or a distance of the pre-definable light pattern from the vehicle.

16. The vehicle according to claim 12, wherein the light unit of the illuminating device comprises a plurality of headlights and the control device is configured to pixel-wise control the light unit by controlling the plurality of headlights to generate the pre-definable light pattern on the projection surface.

* * * * *